United States Patent Office 3,644,396
Patented Feb. 22, 1972

3,644,396
CHRYSANTHEMUM ACID ESTERS OF 1-SUB-STITUTED PYRROLIDINOLS
John Martin Clegg, New York, N.Y., and John Swidinsky, Newark, and Bernard Beau Brown, Westfield, N.J., assignors to CPC International Inc.
No Drawing. Filed June 27, 1968, Ser. No. 740,472
Int. Cl. C07d 27/04
U.S. Cl. 260—326.3                20 Claims

ABSTRACT OF THE DISCLOSURE

This application covers chrysanthemum acid esters. More particularly this application covers 1-substituted-3-pyrrolidinol or 1-substituted-3-pyrrolidinyl alkyl esters of chrysanthemum acid, and their use as insecticides.

---

As is well-known chrysanthemum acid (or chrysanthemum monocarboxylic acid) is an acidic moiety of pyrethrin, cinerin, allethrin, cyclethrin and other pyrethroids, forming insecticidal esters with ketoalcohols of pyrethrolone, cinerolone, allethrolone, cyclethrolone, and their analogoues, respectively.

The chrysanthemum acid residue is found naturally in form of esters as the naturally occurring insecticed pyrethrum, obtained from the flower *Chrysanthemum canerariaefolium* and related species. This is a well established insecticide having a number of desirable biological properties. These include a high insecticidal toxicity, rapid knock-down effect, low mammalian toxicity, etc. However, naturally occurring pyrethrum has a number of drawbacks, including instability in many common formulations and inability to form a sufficiently persistent insecticidal film on all the materials and surfaces to which it needs to be applied in practice. In addition, it is also expensive and in short supply.

In an attempt to overcome these deficiencies, many attempts have been made to prepare synthetic insecticides having a combination of the above desirable biological and physical properties including high toxicity to insects and low mammaliantoxicity. Since the structures of the four related esters in natural pyrethrum have been determined, many attempts have been made to synthesize a number of these esters. One notable derivative of this type is allethrin. However, allethrin is inferior in many respects to natural pyrethrum and is also difficult and expensive to prepare.

It would therefore be an advance in the art to prepare a synthetic ester of a chrysanthemum mono-carboxylic acid which has high insecticidal activity, rapid knock-down effect and lack of mammalian toxicity. It would be a further advantage if such compound had high stability both per se and in various formulations, was relatively inexpensive, and easy to prepare.

It is therefore an object of the present invention to provide a novel group of chrysanthemum carboxylic acid esters which have strong insecticidal activities to house and agricultural insects with low toxicities to warm-blooded animals and plants.

Another object is to prepare such novel esters by commercially available procedures.

A still further object of the invention is to prepare derivatives of the above type which are stable, and may be formulated with a wide variety of solvents and other adjuvants.

Yet another object of the invention is to provide a method of killing a wide variety of house and agricultural insects by contact kill with the above esters.

Other objects will appear hereinafter.

BROAD DESCRIPTION OF THE INVENTION

In accordance with the invention a novel group of chrysanthemum acid esters have been discovered. These esters may be broadly defined as 1-substituted-3-pyrrolidinol or 1-substituted-3-pyrrolidinyl alkyl esters of chrysanthemum acids. Esters encompassed within the scope of the invention include the free bases, and acid and quaternary salts, and are easily synthesized. Typical syntheses will be discussed in more detail hereinafter. The invention is also concerned with use of the esters as insecticides.

In more detail these esters may be more definitively set forth by reference to the following structural formula:

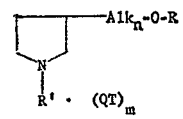

where Alk in said formula represents a bivalent acyclic hydrocarbon moiety, R' is a radical selected from the group consisting of alkyl, alkenyl, aryl, aralkyl and cycloalkyl, Q is a radical selected from the group consisting of hydrogen, lower alkyl, lower alkenyl and aralkyl, T is an anion, n and m each designate 0 or the positive integer 1, and R represents a chrysanthemum acid residue having the following structural formula:

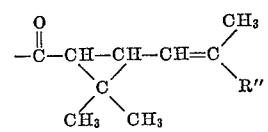

where R" is either a methyl or methoxycarbonyl radical.

DETAILED DESCRIPTION OF INVENTION

R, of course, in the above formula is the moiety or residue remaining after reaction of the chrysanthemum acid. The chrysanthemum acid reactant, of course, then has the following structure:

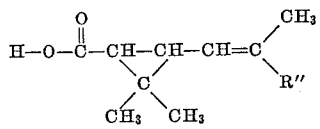

where R" is either a methyl or methoxycarbonyl radical.

As mentioned above, R' may be an alkyl radical including methyl, ethyl, propyl, isopropyl, butyl, isobutyl, sec-butyl, pentyl, isopentyl, tert-pentyl, neopentyl, hexyl, isohexyl, heptyl, octyl, and like radicals. R' may also be alkenyl wherein any of the foregoing radicals or others have at least one double bond present.

Where R' is an aralkyl radical, such groupings as benzyl and phenethyl groups may be present. R' may also be aryl such as phenyl, etc.

R' may also be a cycloalkyl group such as cyclopropyl, cyclopentyl, cyclohexyl, etc.

It is apparent, of course, that R' defined as alkyl etc. radical may be substituted or unsubstituted. When substituted the radical may contain a wide variety of groupings such as hydroxy, halo, such as chloro, bromo, and iodo, amino, nitro, nitrile, alkyl and like substituents.

The group represented by Alk in the formula is a bivalent acyclic hydrocarbon moiety. These radicals are usually straight- or branched-chain lower alkylene or alkenylene radicals. Usually when unsaturated they contain not more than one double bond. They are typified by methylene, ethylene, vinylene, trimethylene, propylene, 1,3-propenylene, tetramethylene, 2-methyl-1,3-propylene, 2,2-dimethyl-1,3-propylene, etc. groupings. It is apparent that the Alk grouping may be present or absent. When $n$ is 0 the Alk grouping is absent and the above defined structures are appropriately formed from a 1-substituted-3-pyrrolidinol wherein the hydroxy group in the 3 position is attached directly to the ring structure.

Preferred esters, particularly those having excellent insecticidal activity, include those where R' is methyl, ethyl, benzyl, phenyl, and cyclohexyl, R" is methyl and the radical represented by Alk is absent, that is $n$ is 0. However, when this radical is present it is preferably a lower alkylene radical such as methylene, and R' and R" are methyl.

As mentioned above, the esters in the invention may either be basic esters or acid addition and quaternary ammonium salts thereof. When the latter compounds are present, of course, $m$ in the above formula is 1. Q then may be selected from among hydrogen, lower alkyls of the type defined above, correspondingly lower alkenyl radicals and aralkyl radicals including benzyl, phenethyl, and naphthylmethyl radicals. T then is the equivalent of an anion which may be, for example, chloride, bromide, iodide, nitrate, phosphate, sulfate, sulfamate, methyl sulfate, ethyl sulfate, benzenesulfonate, toluene sulfonate, acetate, lactate, succinate, malate, maleate, tartrate, citrate, gluconate, ascorbate, benzoate, cinnamate, and the like.

In order to form the above described acid addition salts or quaternary ammonium salts one may either react the acid salt or quaternary salt of pyrrolidinol or a pyrrolidinyl alcohol with chrysanthemum acid. The more preferred procedure however is to form the free base of the ester of chrysanthemum acid, and then subsequently quaternize the basic ester or form the acid addition salt by addition of an appropriate inorganic or organic acid.

Thus, conversion of the basic esters of the invention to equivalent acid addition salts may be accomplished by simple admixture of the esters with any of the various inorganic or organic acids, the anionic portion of which conforms to T as hereinabove defined. The reaction may be accomplished with or without benefit of solvent.

The quaternary ammonium compounds comprehended by the invention are usually derived by contacting the basic esters with appropriate quaternizing agents. Quaternization may take place within a temperature range between 45 and 100° C. using an inert solvent such as chloroform, acetone, butanone, methanol, butanol, and the like as the reaction medium. Quaternization is ordinarily completed in from 1 to 48 hours and is generally carried out in a closed system if a lower alkyl halide such as methyl chloride is one of the reagents. Using methyl bromide, the manufacture of the appropriate quaternary salt of a basic ester may be smoothly effected in butanone solution at 70° C., reaction time being approximately 1 hour.

The esters of the invention as typified by the above formula can exhibit optical and geometrical isomerism, and the invention encompasses all known isomers. However, the various isomers produced have varying insecticidal activity, and with respect to this particular use it is desired to employ the isomer producing the compound of greatest activity. It has been found that the (+)-trans materials and the (±)-cis-trans isomers are more active with respect to insecticidal activity than the (−)-cis isomer. However, it may be otherwise if the particular compounds shown here are used for some other application than as insecticides.

FORMATION OF ESTERS OF INVENTION

As mentioned above, the mode of synthesis in making the esters of the invention may be chosen from a number of conventional procedures. One simple technique is to make the acid halide such as the acid chloride of chrysanthemum acid and reacted it with the appropriate pyrrolidinol or pyrrolidinyl alcohol. Likewise, the acid anhydride may be employed as a reactant. Usually the reactants are reacted in an inert solvent and in the presence of a hydrogen halide acceptor such as pyridine and triethylamine. Benzene and toluene are typical solvents here.

Another useful method is to carry out an ester interchange between a chrysanthemate ester such as the ethyl ester and the pyrrolidinyl alcohol. This reaction is also usually effected in presence of a solvent such as toluene with a compound such as sodium ethylate employed as the driving force.

The just described methods, which for convenience sake may be described as "Method A" and "Method B" are set forth in more detail below as general procedures applicable to formation of a wide variety of esters falling within the scope of the invention.

Method A

To a solution of 0.1 mole of the pyrrolidinyl alcohol in 200 ml. of dry benzene is added 12.2 g. (0.12 mole) of triethylamine, utilized as an acid acceptor. The mixture is cooled to 5° C. and 18.7 g. (0.1 mole) of the appropriate chrysanthemoyl chloride is added at 5–10° C. The reaction mass is then stirred at room temperature for 4–5 hours and allowed to stand overnight. A solid (triethylamine hydrochloride) then precipitates. To the above mixture is added 100 ml. of water, the mixture is stirred for 1 hour, and the water is separated. The mixture is washed twice with 100 ml. portions of water, the benzene removed by means of a water bath, and the product is isolated (generally by vacuum distillation).

Method B

A suspension of 0.01 mole of sodium ethylate is prepared by reacting 0.23 g. of sodium with 15 ml. of ethyl alcohol and 350 ml. of dry toluene under a nitrogen atmosphere. The excess alcohol is removed by distillation through a short column until a permanent B.P. of 110° C. is attained. The suspension is then cooled slightly and 0.10 mole of the substituted pyrrolidinyl alcohol and 0.103 mole (20.1 g.) of ethyl chrysanthemate added. The solution is heated to boiling and distillate removed until a permanent B.P. of 110° C. is attained. The reaction mixture is cooled, washed several times with water, and the product isolated by distillation or crystallization of the residue after removal of toluene.

The following examples illustrate preparations of typical esters of the invention. In all cases the syntheses were carried out according to Methods A or B described above. All parts and percentages are in terms of weight percent unless otherwise indicated.

EXAMPLE I 1-methyl-3-pyrrolidinyl d-trans-chrysanthemate

The above compound was prepared according to the general Method A outlined above. From 10.1 g. (0.1 mole) of 1-methyl-3-pyrrolidinol, 21.7 g. (86.5% yield) of product was obtained. The product had a B.P. of 100–108° C. at 0.1 mm. Analysis indicated that the product was pure.

EXAMPLE II 1-phenyl-3-pyrrolidinyl d,l-cis. trans-chrysanthemate

The above product was also obtained via Method A. From 16.3 g. (0.1 mole) of 1-phenyl-3-pyrrolidinol, 29.11 g. (98% yield) of product was obtained. The product had a B.P. of 164–186° C. at 0.2 mm. Analysis again indicated the product was of relatively high purity.

EXAMPLE III 1-cyclohexyl-3-pyrrolidinyl d-trans-chrysanthemate

This product was obtained by following Method A. From 16.9 g. (0.1 mole) of 1-cyclohexyl-3-pyrrolidinol was obtained 29.7 g. (92.6% yield) of product. The product had a B.P. of 160–170° C. at 0.08–0.15 mm. Again analysis indicated the product was pure.

EXAMPLE IV 1-methyl-3-pyrrolidinylmethyl d,l-cis,trans-chrysanthemate

This product was obtained by reacting 11.5 g. of 1-methyl-3-pyrrolidinylcarbinol with the ethyl chrysanthemate ester according to Method B. 23.7 g. of product was obtained which had a B.P. of 92.98° C. at 0.1 mm. Only traces of ethyl chrysanthemate were found in the product which was produced in a yield of 89.4%.

EXAMPLE V 1-methyl-3-pyrrolidinyl d-trans-chrysanthemate hydrochloride

This product was obtained by reacting the product of Example I with hydrochloric acid.

EXAMPLE VI 1-ethyl-3-pyrrolidinyl d-trans-chrystanthemate

This product was obtained according to the procedure of Example I with the exception that 1-ethyl-3-pyrrolidinol was the starting material. The product was obtained in a yield of 88.5%.

EXAMPLE VII 1-methyl-3-pyrrolidinyl d,l-cis,trans-chrysanthemate

This product was prepared according to the procedure of Example I with the exception that the chrysanthemoyl chloride starting material was the d,l-cis, trans isomer.

EXAMPLE VIII 1,1-dimethyl-3-pyrrolidinyl d-trans-chrysanthemate methosulfate

This product was prepared by quaternizing the product of Example I with dimethyl sulfate.

EXAMPLE IX 1-benzyl-3-pyrrolidinyl d-trans-chrysanthemate

This product was prepared according to the procedure of Example I with the exception that 1-benzyl-3-pyrrolidinol was employed as the starting material. The product was obtained in a 90% yield.

EXAMPLE X 1-benzyl-3-pyrrolidinyl d,l-cis,trans-chrysanthemate

This product was prepared according to the procedure of Example IX with the exception that the chrysanthemoyl chloride reactant was the d,l-cis, trans isomer.

INSECTICIDAL ACTIVITY

The just described esters of the invention have activity in a wide variety of fields of application. For example, they are useful as herbicides, nematocides, growth regulators, fungacides, pisicides, etc. They are particularly useful as powerful insecticides and have a high insecticidal toxicity and rapid knock-down effect. Moreover, they have relatively low mammalian toxicity.

They are effective against a wide variety of house and agricultural insects including house flies, mosquitoes, cockroaches, lice, and other insect pests. Their insecticidal activity is best carried out by contacting these insects or others with the esters.

The insecticidal composition of the invention moreover may be formulated as the essential active ingredient in an oil solution, emulsifiable concentrate, wettable powder, dust, aerosol, mosquito coil, bait, and as other preparations. They may be formulated using the generally employed carriers, diluents or auxiliary agents according to the methods known to those skilled in the art. If the ester compound is crystalline, it is preferably employed as a preliminarily prepared solution in an organic solvent, such as acetone, xylene, methylnaphthalene, etc. depending upon the type of the formulation desired.

The salt and quaternary esters of the invention are particularly useful in that they may be formulated in aqueous solvents and sprayed as such through means of an aerosol bomb, for application as a fine mist they may be dissolved in a liquefied gas, such as dichlorodifluoromethane or methyl chloride, in the usual type of aerosol bomb. For application in the dry state, they may be incorporated with talc, ground walnut hulls, pyrophyllite, or with other solid powdered carriers.

If desired, the present esters may be employed for the preparation of an insecticidal composition in combination with other insecticidal components, such as pyrethroide, for example, pyrethrum extract and allethrin, organochlorine, and organophosphorous compounds with synergistic agents for pyrethroide, for example, piperonyl butoxide, piperonyl sulfoxide, beta,butoxy-beta'-thiocyanodiethyl ether and the like. By combination with such other ingredients, the present insecticidal compositions can be adopted to broader uses with more increased effect.

As typical examples the present esters of the invention may be blended with at least one of the following compounds of pyrethrin, allethrin O,O-dimethyl-O-(3-methyl-4-nitrophenyl) thiophosphate, malathion, diazinone, dimethoate, and others to yield overall compositions which possess high insecticidal activities with rapid effectivity. In such cases, a component such as one of those listed above or others may be blended with the present esters in a broad range of proportions, for example, in a ratio of 0.05:1 to 1:0.05 by weight.

The present esters have been found to be comparatively stable. However, if they are intended to be stored under a severe condition for a long period of time they may be preferably treated with a small amount of a stabilizer, for example, an alkylphenol compound.

The efficiency of the ester compositions of the invention as insecticides is shown as follows.

In a series of tests the esters described above were then evaluated for their insecticidal activity. The method employed was as follows.

Essentially the method involved in evaluating the compounds of the invention as insecticides was one involving a topical application of the insect. An Arnold Applicator, manufactured by Brukard Manufacturing Company Limited, England, was used to apply the chemical. Application to insects was done singly and in groups of 10 to 20 per petri dish. There were generally 3 to 5 replicates of each group. The chemical dosage in acetone or 2-pyrrolidone solution was placed on the thorax of the insect already treated to prevent its removal by cleaning or other movements of the insect. Before the compound is applied the insect is anesthesized with carbon dioxide. The insects are held by forceps or a vacuum pencil and the dose applied to the insect by touching the thorax to the drop produced at the orifice of the needle on the applicator. By capillary action the dose of the candidate compound for testing is then applied. The effect reported here is mortality ($LD_{50}$). Only female flies were used in the test as it is known that females are more difficult to kill than male flies. Results of this testing are shown below. The values shown are $LD_{50}$ expressed as µg./fly.

TABLE I

| Compound | LD$_{50}$ |
|---|---|
| 1 - methyl - 3-pyrrolidinyl d-trans-chrysanthemate | 0.03 |
| 1 - cyclohexyl - 3 - pyrrolidinyl-d-trans-chrysanthemate | 0.46 |
| 1 - methyl - 3 - pyrrolidinylmethyl d,1-cis,-trans-chrysanthemate | 0.140 |
| 1-methyl - 3 - pyrrolidinyl d-trans-chrysanthemate hydrochloride | 7.4 |
| 1 - ethyl - 3 - pyrrolidinyl d-trans-chrysanthemate | 0.048 |
| 1 - methyl - 3 - pyrrolidinyl d,1-cis,trans-chrysanthemate | 0.092 |
| 1,1 - dimethyl - 3 - pyrrolidinyl d-trans-chrysanthemate methosulfate | 4.9 |
| 1 - benzyl - 3 - pyrrolidinyl d-trans-chrysanthemate | 0.85 |
| 1 - benzyl - 3 - pyrrolidinyl d,1-cis,trans-chrysanthemate | 6.95 |

In most of the cases the compounds of the invention showed superior insecticidal activity compared to the naturally occurring pyrethrums and were comparable if not superior to a wide number of commercially available insecticides of varying chemical make-up.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. An ester of chrysanthemum acid having the following structural formula:

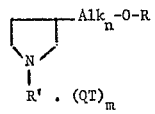

where Alk is a straight or branched chain lower alkylene or alkenylene radical having less than 6 carbons, R' is a radical having up to 8 carbon atoms, inclusive, selected from the group consisting of alkyl, alkenyl, phenyl, benzyl, phenethyl and cycloalkyl, Q is a radical selected from the group consisting of hydrogen, lower alkyl and alkenyl radicals having up to 8 carbon atoms inclusive, benzyl, phenethyl, and naphthylmethyl radicals, T is an anion selected from the group consisting of chloride, bromide, iodide, nitrate, phosphate, sulfate, sulfamate, methyl sulfate, ethyl sulfate, benzene sulfonate, toluene sulfonate, acetate, lactate, succinate, malate, maleate, tartrate, citrate, gluconate, ascorbate, benzoate and cinnamate, $n$ and $m$ each designate 0 or 1 and R represents a chrysanthemum acid residue having the following structural formula:

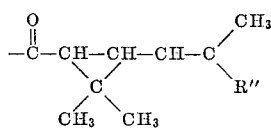

where R" is either a methyl or methoxycarbonyl radical.

2. The ester of claim 1 where $n$ and $m$ are zero and R' is an alkyl radical.
3. The ester of claim 2 where R' is methyl.
4. The ester of claim 2 where R' is ethyl.
5. The ester of claim 3 where R" is methyl.
6. The ester of claim 4 where R" is methyl.
7. The ester of claim 1 where $m$ is 1, Q is hydrogen, T is chloride, and R' is methyl.
8. The ester of claim 1 where R' is benzyl and $n$ and $m$ are zero.
9. The ester of claim 8 where R' is benzyl.
10. The ester of claim 9 where R" is methyl.
11. The ester of claim 1 where R' is phenyl.
12. The ester of claim 11 where R" is methyl.
13. The ester of claim 1 where R' is cycloalkyl and $n$ and $m$ are zero.
14. The ester of claim 13 where R' is cyclohexyl.
15. The ester of claim 14 where R" is methyl.
16. The ester of claim 1 where $n$ is 1, $m$ is zero and Alk represents a lower alkylene radical.
17. The ester of claim 16 where Alk is methylene.
18. The ester of claim 17 where R' is methyl.
19. The ester of claim 18 where R" is methyl.
20. The ester of claim 1 where $n$ is zero, $m$ is 1, R' and Q are methyl, and T is a methosulfate radical.

References Cited

UNITED STATES PATENTS 3,318,766  5/1967  Kato et al. _____ 260—326.3 X

ALEX MAZEL, Primary Examiner

J. A. NARCAVAGE, Assistant Examiner

U.S. Cl. X.R.

424—274